(12) United States Patent
Lebowitz

(10) Patent No.: US 7,004,360 B2
(45) Date of Patent: Feb. 28, 2006

(54) EASY POUR TEA KETTLE

(75) Inventor: Samuel Lebowitz, Shelter Island, NY (US)

(73) Assignee: Wilton Industries, Inc., Woodridge, IL (US)

( * ) Notice: Subject to any disclaimer, the term of this patent is extended or adjusted under 35 U.S.C. 154(b) by 105 days.

(21) Appl. No.: 10/403,436

(22) Filed: Mar. 31, 2003

(65) Prior Publication Data

US 2004/0188468 A1    Sep. 30, 2004

(51) Int. Cl.
B65D 25/04 (2006.01)

(52) U.S. Cl. .................... 222/500; 222/189.07; 137/38

(58) Field of Classification Search .................. 222/39, 222/147, 188, 189.07, 465.1, 470, 477, 500, 222/561, 564, 189.06, 189.09, 465.4; 137/38, 137/43, 533
See application file for complete search history.

(56) References Cited

U.S. PATENT DOCUMENTS

| | | | | |
|---|---|---|---|---|
| 199,188 A | * | 1/1878 | Crowell .................. 222/189.07 |
| 201,034 A | * | 3/1878 | Menaar et al. ........... 222/465.1 |
| 1,161,713 A | * | 11/1915 | Madsen ........................ 116/70 |
| 1,164,453 A | * | 12/1915 | Belles .................... 222/189.07 |
| 1,352,650 A | * | 9/1920 | Blanchard ..................... 215/312 |
| 2,099,629 A | * | 11/1937 | Schaetzel .................... 222/500 |
| 2,344,386 A | * | 3/1944 | Berger .......................... 99/319 |
| 2,670,107 A | | 2/1954 | Welden |
| 4,813,368 A | | 3/1989 | Hutter, III et al. |
| 4,880,951 A | * | 11/1989 | Levinson .................... 219/733 |
| 5,588,567 A | | 12/1996 | Yeh |
| 5,693,244 A | * | 12/1997 | Pragt et al. ................. 219/441 |
| 6,102,240 A | * | 8/2000 | Haas et al. .............. 220/573.1 |
| 6,386,136 B1 | | 5/2002 | Huff |
| 6,390,014 B1 | * | 5/2002 | Ghidini ....................... 116/150 |
| 6,494,161 B1 | * | 12/2002 | Weiss et al. ............ 116/137 R |

\* cited by examiner

Primary Examiner—Frederick C. Nicolas
Assistant Examiner—Meivin A. Cartagena
(74) Attorney, Agent, or Firm—DLA Piper Rudnick; Gray Cary US LLP

(57) ABSTRACT

A tea kettle includes kettle body and a lid that covers a fill opening in the body. The lid includes a knob within which a whistle is positioned. A spout is attached to the kettle body and has a passageway. A ball seat is positioned within the passageway as is a strainer. A ball is positioned between the ball seat and the strainer so as to close an opening in the ball seat, and thus the spout passage, when the kettle is positioned on a level surface. The ball rolls out of the ball seat to permit pouring when the kettle is tilted and is prevented from rolling out of the spout by the strainer. The kettle body has a top portion constructed of stainless steel and a bottom portion constructed of steel coated with enamel.

21 Claims, 2 Drawing Sheets

EASY POUR TEA KETTLE

BACKGROUND OF THE INVENTION

The invention relates generally to tea kettles and, more particularly, to a tea kettle having an improved whistle arrangement and construction.

Tea kettles are well known in the art for use in heating water or the like to be used, for example, in making tea or other beverages. Such tea kettles include a kettle body that defines a chamber for receiving a supply of liquid. An insulated handle is typically attached to the kettle body. In addition, the kettle body is typically provided with a pour spout with a passage that communicates with the chamber so that the heated liquid may be poured out of the kettle. A fill opening may be formed in the top portion of the kettle body or, alternatively, the kettle may simply be refilled through the spout.

The kettle body is constructed from a material which will permit direct exposure to a source of heat, such as the burner of a stove. A cap is typically positioned over the kettle spout and a lid covers the fill opening in the kettle body (if the kettle features a fill opening) so that the chamber within the kettle body is maintained substantially closed while liquid therein is heated to boiling. The resulting steam operates a whistle to provide an audible signal indicating that the liquid in the kettle has reached boiling. In addition to the functional purpose, there is a certain nostalgic enjoyment obtained when this familiar sound is recognized, provided that the sound is not unpleasant.

Prior art kettles typically feature a whistle disposed in the cap covering the spout. Examples of such Kettles may be found in U.S. Pat. No. 2,670,107 to Welden, U.S. Pat. No. 4,813,368 to Hutter, III et al., U.S. Pat. No. 5,588,567 to Yeh and U.S. Pat. No. 6,386,136 to Huff. While such whistles are effective, the tea kettle cap must be removed to permit liquid to be poured from the kettle. This requires the user to push or otherwise manipulate a trigger or the like to open the cap. This additional action may be quite inconvenient when the kettle is full of liquid and thus difficult to lift and maneuver during pouring.

In addition, some prior art tea kettle whistle designs tend to be relatively complicated and therefore expensive to produce and assemble. Furthermore, some prior art whistle designs employ a combination of plastic and metal parts that are assembled using screws. This type of design is unsatisfactory, however, due to the relative difficulty of assembly. In addition, the screws tend to work loose as a result of the heat encountered in combination with the different coefficients of thermal expansions for the different materials.

Prior art tea kettle spouts and caps also typically do not provide straining of liquids as they are poured from the kettle. Such a feature is desirable as it prevents particles in the liquid from being poured into a cup or the like.

With regard to materials used to construct the tea kettle body, prior art tea kettles often use stainless steel because it is scratch resistant and chemically non-reactive. It is also easy to clean and requires no special maintenance. Unfortunately, stainless steel is not a very good conductor of heat and, as a result, such kettles often have a bottom base of aluminum or copper. Such an arrangement, however, still does not provide optimal heating of the liquid contents of the kettle and the connection between the bottom and the rest of the kettle may rupture and cause leakage if the bottom is dented.

Prior art tea kettles have also been constructed from steel covered with enamel (enamel-on-steel). Such tea kettles transfer heat much more quickly than stainless steel and provide more even heat distribution through the walls of the kettle body. As a result, the liquid in the kettle is warmed more quickly. The enamel is durable and chip resistant and protects the steel core from rust and is easy to clean. A disadvantage of constructing the entire kettle with enamel-on-steel, however, is that the kettle becomes relatively heavy (as compared to stainless steel construction) and thus is more difficult to carry and maneuver during pouring.

Accordingly, it is an object of the present invention to provide a tea kettle that permits pouring without removal of a spout cap.

It is another object of the present invention to provide a tea kettle that has a whistle that is economical to construct and that is durable.

It is another object of the present invention to provide a tea kettle that permits liquid therein to be quickly heated.

It is still another object of the present invention to provide a tea kettle that facilitates pouring.

It is still another object of the present invention to provide a tea kettle that strains liquid.

SUMMARY OF THE INVENTION

The present invention is directed to a tea kettle that includes a kettle body defining a chamber. A spout having a passageway is in communication with the chamber as is a whistle positioned within the knob of a lid that closes the fill opening of the kettle. A ball seat is positioned within the passageway of the spout and has an opening. A strainer is also positioned in the passageway of the spout.

A ball is positioned between the ball seat and the strainer and has a diameter that is greater than the diameter of the ball seat opening so that the ball closes the opening of the ball seat when the tea kettle is resting on generally horizontal surface. The spout passageway has a diameter that is greater than the diameter of the ball so that the ball rolls away from the spout opening when the tea kettle is tipped so that a liquid in the chamber may flow through the ball seat opening and the passageway while the ball is prevented from rolling out of the spout by the strainer.

The kettle body includes a top portion constructed of stainless steel and a bottom portion that is constructed of steel covered by enamel. The top portion includes an annular skirt and the bottom portion includes an annular lip. The lip is sized to engage the skirt so that the top and bottom portions of the kettle body are secured together. A gasket is positioned between the skirt and lip.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
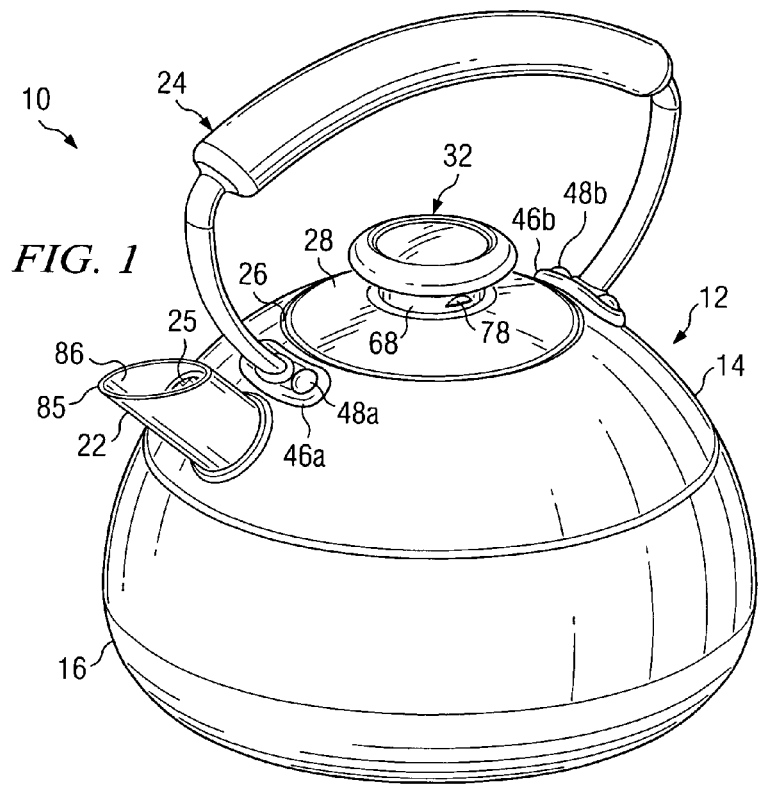
FIG. 1 is a perspective view of an embodiment of the tea kettle of the present invention.
Figure 2:
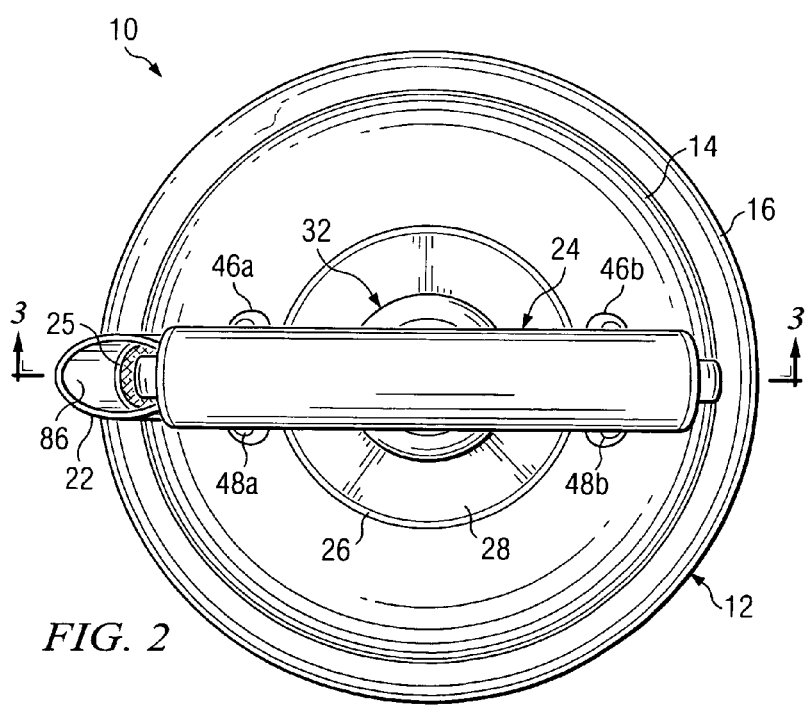
FIG. 2 is a top plan view of the tea kettle of FIG. 1.

An embodiment of the tea kettle of the present invention is indicated in general at 10 in FIGS. 1 and 2. The tea kettle includes a body, indicated in general at 12. The kettle body includes a top portion 14 and a bottom portion 16. A spout 22 and handle 24 are attached to the top portion 14 of the kettle body. As will be explained in greater detail below, the spout 22 is equipped with a strainer 25. A fill opening 26 is formed in the top portion of the kettle body. A lid 28 having a knob 32 is positioned within the fill opening 26 in a removable fashion.

Figure 3:
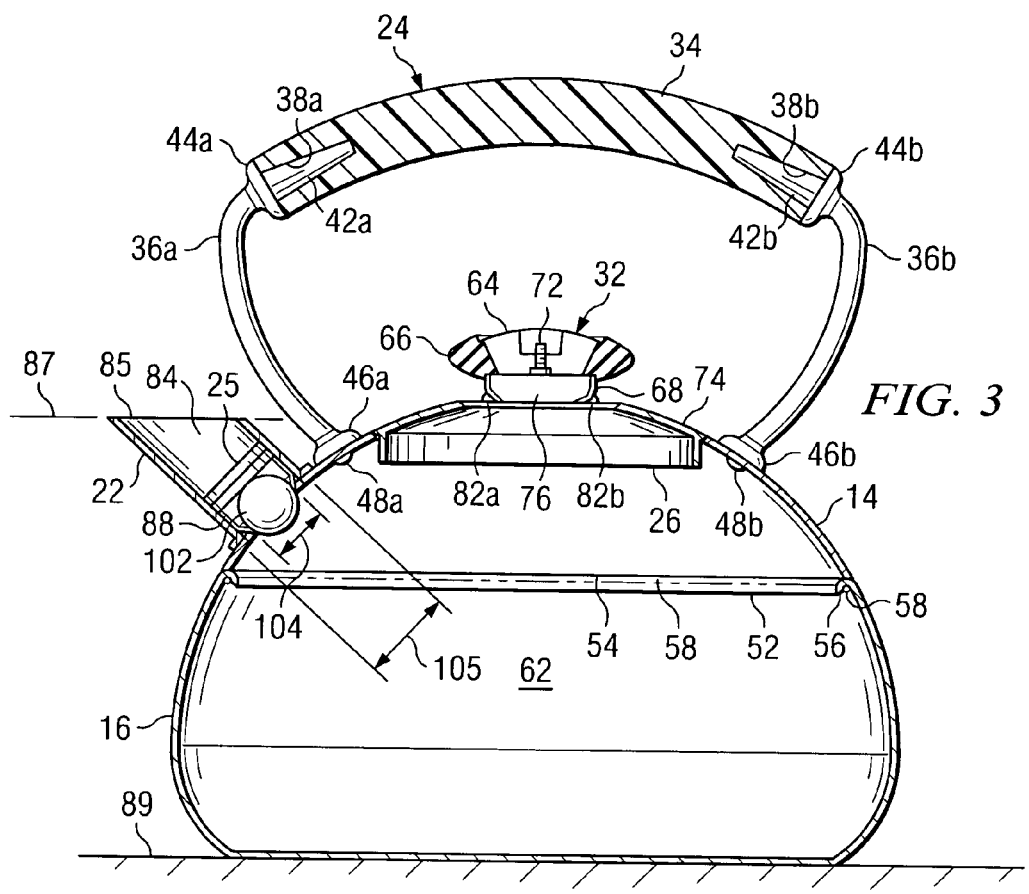
FIG. 3 is a cross-sectional view of the tea kettle of FIG. 2 taken along line 3—3.

A cross-sectional view of the kettle of FIGS. 1 and 2 is provided in FIG. 3. The kettle handle, indicated in general at 24, includes an insulated grip 34 that is joined to the top portion of the kettle body by legs 36a and 36b. The grip 34 is preferably molded from a material that provides insulation, is comfortable to grip and that provides enhanced friction. An example of such a material is SANTOPRENE.

Cavities 38a and 38b are molded in opposing ends of the handle 34. Mating protrusions 42a and 42b are formed on the upper ends of the legs 36a and 36b and are secured within the cavities 38a and 38b with adhesive. Collars 44a and 44b abut the opposing ends of the grip 34 as well. As illustrated in FIGS. 1, 2 and 3, the lower ends of the legs include bases 46a and 46b. The leg bases are secured to the top portion of the kettle body by rivets 48a and 48b.

The top portion 14 of the kettle body is preferably constructed from stainless steel. As illustrated in FIG. 3, the top portion 14 is provided with an annular skirt 52 positioned on its bottom edge 54. The bottom portion 16 of the kettle body is preferably constructed from steel covered with porcelain enamel. An annular, inwardly curled lip 56 is formed around the top edge 58 of the bottom portion 16 and engages the skirt 52 of the top portion 14. The lip 56 and skirt 52 are sized so as to fit in an interference fitting fashion and a gasket, indicated in phantom at 58, is positioned between the lip and skirt so that the joint is water-tight. The gasket 58 is preferably formed from injection molded silicone.

The kettle body defines an interior chamber 62. The chamber of the kettle may be easily filled with liquid by removing lid 28 from fill opening 26. Once the kettle is filled, the lid is replaced and closes the fill opening 26 as illustrated in FIGS. 1–3. The lid 28 of the kettle is also preferably constructed from stainless steel.

The lid of the kettle is provided with a knob, indicated in general at 32 in FIG. 3, that includes a hub 64 that is surrounded by a gripping portion 66. The gripping portion of the knob preferably is formed from SANTOPRENE so as to provide insulation and increase friction and comfort for gripping. The gripping portion 66 is preferably attached to the hub 64 by adhesive.

The knob 32 of the tea kettle lid also functions as a whistle. More specifically, the hub 64 of the knob, which is preferably constructed from stainless steel, sits on top of a whistle body 68 to which it is secured by screw 72. Whistle body 68, in combination with the top surface 74 of the lid, defines a whistle hollow 76 and has at least one arc-shaped cut-out (and preferably two) in its side wall, as indicated at 78 in FIG. 1. As indicated at 82a and 82b in FIG. 3, a pair of slots are formed in the top surface of 74 of the lid so that steam from the kettle chamber 62 may enter the whistle hollow 76 and travel out arc-shaped openings 78 (FIG. 1) so as to produce a whistling sound to provide an audible signal to indicate boiling of the liquid within the kettle.

With reference to FIG. 3, the spout 22 is preferably also constructed of stainless steel and features a central passageway 84 that communicates with the interior chamber 62 of the kettle. The distal end 85 of the spout is configured such that the spout opening 86 is oriented in a horizontal plane 87 when the kettle is resting on a flat horizontal surface 89. This permits easy and dripless pouring of liquid from the kettle.

When the liquid within the kettle boils, steam is produced and will take the path of least resistance out of the kettle. As a result, the steam will travel through the spout 22 if it is left uncovered. Under such a scenario, the steam would not travel through the whistle body 68 and, as a result, the whistle would not operate.

Figure 4A:
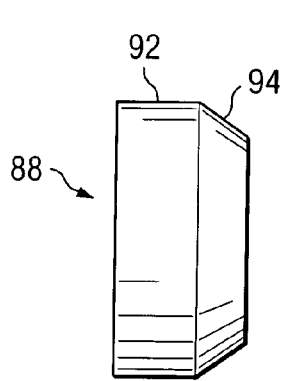
FIGS. 4A and 4B are enlarged side elevational and bottom plan views of the ball seat of the tea kettle of FIG. 3.
Figure 4B:
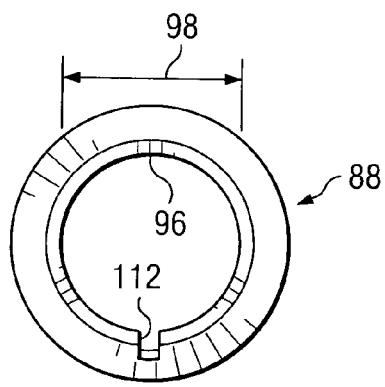

To address this issue, a ball seat 88 is positioned within the passageway 84 of the spout, as illustrated in FIG. 3. As illustrated in FIGS. 4A and 4B, the ball seat, indicated in general at 88, is open in the center and features a cylindrical portion 92 and a frusto-conical portion 94. The frusto-conical portion 94 terminates in an opening 96 having a diameter 98. The conical portion is secured to the interior surface of the spout via soldering, adhesive or other attachment means known in the art.

A ball, indicated at 102 in FIG. 3, rests in ball seat 88 when the kettle is sitting on a flat, horizontal surface. The ball preferably is constructed from steel. The diameter 98 (FIG. 4B) of the opening 96 of the ball seat is sized smaller than the maximum diameter 104 (FIG. 3) of the ball so that the ball does not fall into the chamber 62 of the tea kettle. The maximum diameter of the ball is sized smaller than the diameter 105 (FIG. 3) of the spout passageway so that the ball is free to roll in the passageway.

The combination of the ball 102 and ball seat 88 serves as a valve so that steam cannot escape through the spout 22 when the kettle is sitting on a flat horizontal surface, such as the burner of a stove. As a result, steam from boiling liquid within the kettle is forced through the whistle body 68 of the kettle lid so that the whistle sounds. When the kettle is tilted so that liquid may be poured, however, the ball 102 of FIG. 3 rolls out of the ball seat to permit liquid to pass through the ball seat opening 96 (FIG. 4B) and travel through the passage 84 of the spout 22.

In order to prevent the ball 102 of FIG. 3 from rolling out of the distal end of the spout 85 (and opening 86 in FIGS. 1 and 2) when the kettle is tilted, a strainer 25 is also positioned within the spout, as illustrated in FIGS. 1–3. In addition to securing the ball within the spout, the strainer strains or filters liquid as it is poured out of the kettle chamber and through the passage of the kettle spout.

Figure 5:
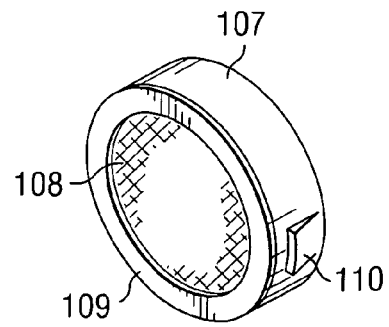
FIG. 5 is an enlarged perspective view of the strainer of the tea kettle of FIG. 3.

As illustrated in FIG. 5, the strainer includes ring-like portion 107 to which a screen 108 is secured via a rim 109. More specifically, the circumferential edge of the screen is positioned between the ring and the rim and the assembly is secured together with adhesive. The strainer is secured within the passage of the spout by tabs, one of which is indicated at 110 in FIG. 5, which are formed in the ring-like portion and provide an interference fit with the interior surface of the spout 22.

As indicated in FIG. 4B, the drain seat is provided with a drain notch 112. This prevents liquid from being trapped in the kettle spout and ball seat after liquid has been poured and the kettle is returned to a level, horizontal surface.

The kettle of the present invention thus provides a whistle feature yet liquid may be poured therefrom without removing a cap from the spout. The whistle is also simple, easy to construct and durable. In addition, the kettle of the present invention provides the convenience of a fill opening as well as straining and dripless pouring capabilities.

The enamel-on-steel construction of the bottom portion of the kettle body permits the kettle to warm and boil liquid in the kettle quickly and efficiently. The relatively lightweight, stainless steel top portion of the kettle body reduces the weight of the kettle (as compared to a total enamel-on-steel construction), thus making it easier to maneuver and tilt for pouring. In addition, the stainless steel portions of the kettle offer the necessary higher dimensional tolerances required to accomplish the ball valve and strainer features and further offers a better seal between the lid and body opening to reduce steam leakage and effect a louder whistle. The kettle body is also durable, easy to clean and aesthetically pleasing.

While the preferred embodiments of the invention have been shown and described, it will be apparent to those skilled in the art that changes and modifications may be made therein without departing from the spirit of the invention, the scope of which is defined by the appended claims.

What is claimed is:

1. A tea kettle comprising:
    a) a kettle body defining a chamber;
    b) a spout having a passageway in communication with the chamber;
    c) a ball seat disposed within the passageway of the spout and having an opening therethrough;
    d) a whistle attached to the kettle body and in communication with the chamber independent of the opening of ball seat; and
    e) a ball positioned and sized to roll in the passageway of the spout, said ball having a diameter greater than a diameter of the opening of said ball seat so that said ball closes the opening of said ball seat when the tea kettle is resting on generally horizontal surface so that steam is directed through said whistle when a boiling liquid is in the chamber of said kettle body and said ball rolls away from the ball seat opening when the tea kettle is tipped so that a liquid in the chamber may flow through the ball seat opening and the passageway of the spout; and
    f) a strainer disposed in the passageway of the spout and positioned so as to prevent the ball from rolling out of the passageway of the spout when the kettle is tilted.

2. The tea kettle of claim 1 wherein the strainer includes a screen surrounded by a rim that secures the strainer within the spout.

3. The tea kettle of claim 1 further comprising a lid and wherein the kettle body includes a fill opening with the lid removably closing the fill opening and the whistle is positioned within the lid.

4. The tea kettle of claim 3 wherein the lid includes a knob and the whistle is positioned in the knob of the lid.

5. The tea kettle of claim 4 wherein the knob includes a whistle body with a gripping portion attached thereto, the whistle body defining a whistle hollow that is in communication with the chamber of the tea kettle.

6. The tea kettle of claim 1 wherein the spout has an opening that is oriented in a horizontal plane when the kettle is resting on a horizontal surface.

7. The tea kettle of claim 1 wherein the kettle body includes a top portion constructed of a first material and a bottom portion that is constructed of a second material.

8. The tea kettle of claim 7 wherein the first material is stainless steel and the second material is steel covered with enamel.

9. The tea kettle of claim 7 wherein the top portion includes an annular skirt and the bottom portion includes an annular lip, said lip sized to engage said skirt so that the top and bottom portions of the tea kettle body are secured together.

10. The tea kettle of claim 9 wherein a gasket is positioned between the skirt and lip.

11. The tea kettle of claim 1 where in the ball seat includes a drain notch.

12. The tea kettle of claim 1 wherein the ball seat includes a cylindrical portion that engages the spout and a frusto-conical portion that includes the ball seat opening.

13. The tea kettle of claim 1 wherein the whistle communicates with the chamber of the kettle body independent of the spout.

14. A tea kettle comprising:
    a) a kettle body defining a chamber;
    b) a spout having a passageway in communication with the chamber;
    c) a ball seat disposed within the passageway of the spout and having an opening therethrough;
    d) a whistle attached to the kettle body and in communication with the chamber independent of the opening of the ball seat;
    e) a strainer disposed in the passageway of the spout and positioned so as to prevent the ball from rolling out of the passageway of the spout when the kettle is tilted.
    f) a ball positioned between the ball seat and the strainer, said ball having a diameter greater than a diameter of the ball seat opening so that said ball closes the opening of said ball seat when the tea kettle is resting on generally horizontal surface so that steam is directed through said whistle when boiling liquid is in the chamber of the kettle body; and
    g) said spout passageway having a diameter that is greater than the diameter of the ball so that the ball rolls away from the spout opening when the tea kettle is tipped so that
    a liquid in the chamber may flow through the ball seat opening and the passageway while the ball is prevented from rolling out of the spout by the strainer.

15. The tea kettle of claim 14 wherein the strainer includes a screen surrounded by a rim that secures the strainer within the spout.

16. The tea kettle of claim 14 further comprising a lid and wherein the kettle body includes a fill opening with the lid removably closing the fill opening and the whistle is positioned within the lid.

17. The tea kettle of claim 16 wherein the lid includes a knob and the whistle is positioned in the knob of the lid.

18. The tea kettle of claim 14 wherein the kettle body includes a top portion constructed of a first material and a bottom portion that is constructed of a second material, said top portion including an annular skirt and the bottom portion including an annular lip, said lip sized to engage said skirt so that the top and bottom portions of the tea kettle body are secured together.

19. The tea kettle of claim 18 wherein the first material is stainless steel and the second material is steel covered with enamel.

20. The tea kettle of claim 18 wherein a gasket is positioned between the skirt and lip.

21. The tea kettle of claim 14 wherein the whistle communicates with the chamber of the kettle body independent of the spout.

* * * * *